(12) United States Patent
Chambert et al.

(10) Patent No.: US 11,013,969 B2
(45) Date of Patent: May 25, 2021

(54) HOCKEY STICK WITH NANOFIBER REINFORCEMENT

(71) Applicant: Bauer Hockey Ltd., Blainville (CA)

(72) Inventors: Martin Chambert, Piedmont (CA); Edouard Rouzier, Montreal (CA); Jean-Frédérik Caron Kardos, Laval (CA); Mathieu Ducharme, Prevost (CA)

(73) Assignee: Bauer Hockey, LLC, Exeter, NH (US)

(*) Notice: Subject to any disclaimer, the term of this patent is extended or adjusted under 35 U.S.C. 154(b) by 0 days.

(21) Appl. No.: 16/576,867

(22) Filed: Sep. 20, 2019

(65) Prior Publication Data

US 2020/0094118 A1    Mar. 26, 2020

Related U.S. Application Data

(60) Provisional application No. 62/734,532, filed on Sep. 21, 2018.

(51) Int. Cl.
| | |
|---|---|
| A63B 59/70 | (2015.01) |
| B29C 70/34 | (2006.01) |
| A63B 102/24 | (2015.01) |
| A63B 102/22 | (2015.01) |
| A63B 102/02 | (2015.01) |
| B29L 31/52 | (2006.01) |
| A63B 102/14 | (2015.01) |
| A63B 102/32 | (2015.01) |
| B29K 105/08 | (2006.01) |
| B29K 307/04 | (2006.01) |
| B29K 309/08 | (2006.01) |
| A63B 102/18 | (2015.01) |

(52) U.S. Cl.
CPC ............ *A63B 59/70* (2015.10); *B29C 70/345* (2013.01); *A63B 2102/02* (2015.10); *A63B 2102/14* (2015.10); *A63B 2102/18* (2015.10); *A63B 2102/22* (2015.10); *A63B 2102/24* (2015.10); *A63B 2102/32* (2015.10); *A63B 2209/023* (2013.01); *B29K 2105/089* (2013.01); *B29K 2307/04* (2013.01); *B29K 2309/08* (2013.01); *B29L 2031/5227* (2013.01)

(58) Field of Classification Search
CPC ......... A63B 59/70; A63B 60/46; A63B 60/00; A63B 2102/24; A63B 2102/22; B29C 70/345
USPC .......................................................... 473/561
See application file for complete search history.

(56) References Cited

U.S. PATENT DOCUMENTS

| | | | |
|---|---|---|---|
| 6,241,633 B1* | 6/2001 | Conroy | B29C 43/12 473/561 |
| 2019/0046851 A1* | 2/2019 | Phelan, Jr. | A63B 60/16 |

* cited by examiner

*Primary Examiner* — Eugene L Kim
*Assistant Examiner* — Rayshun K Peng
(74) *Attorney, Agent, or Firm* — Banner & Witcoff, Ltd.

(57) ABSTRACT

A construct for a hockey stick formed from layers of fiber tape and a reinforcing nanofiber material. The nanofiber is integrated into the molded hockey stick to increase the strength and toughness of inter-laminar bonds between the fiber tape. The nanofiber may include carbon nanotubes.

10 Claims, 10 Drawing Sheets

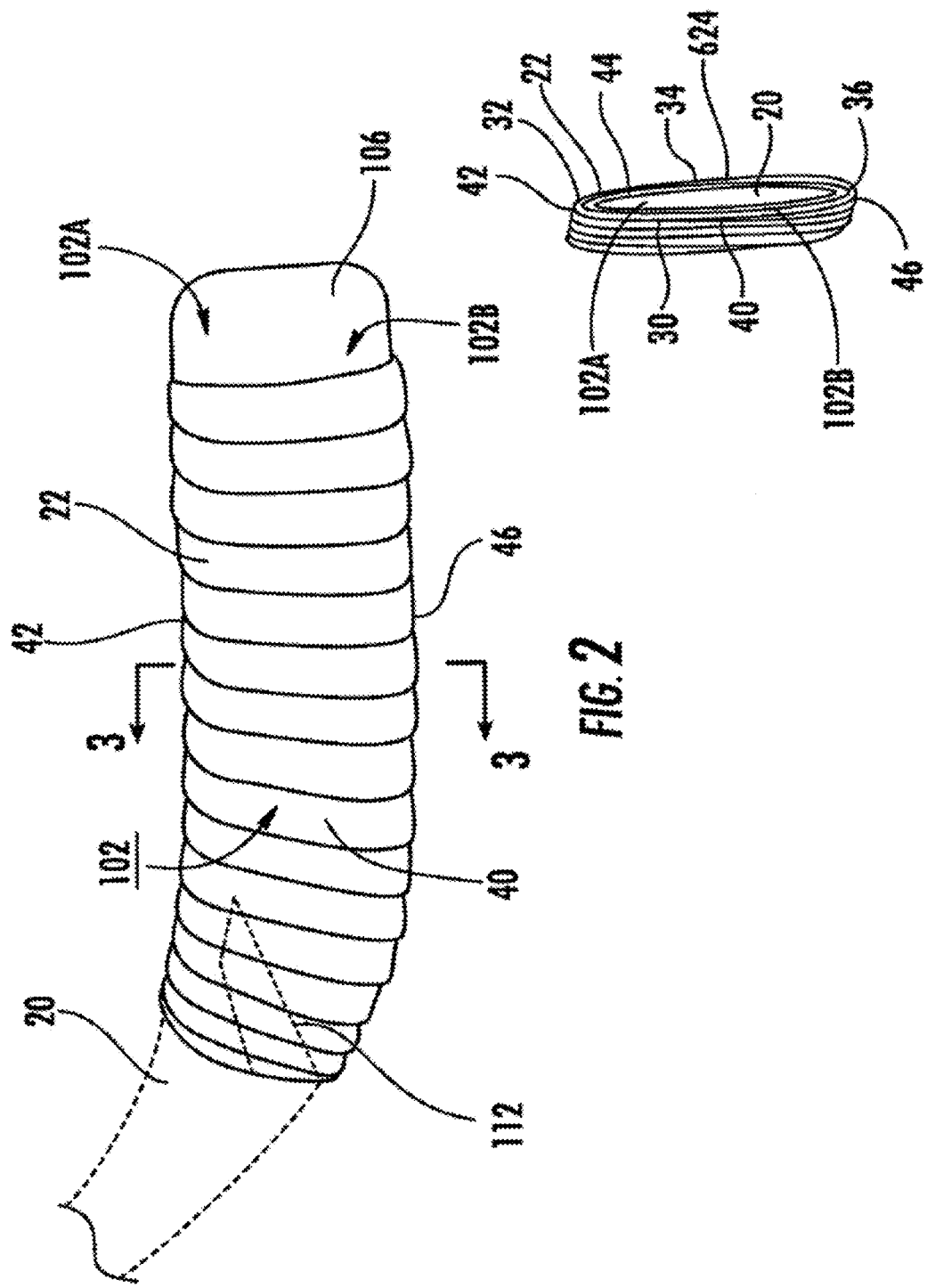

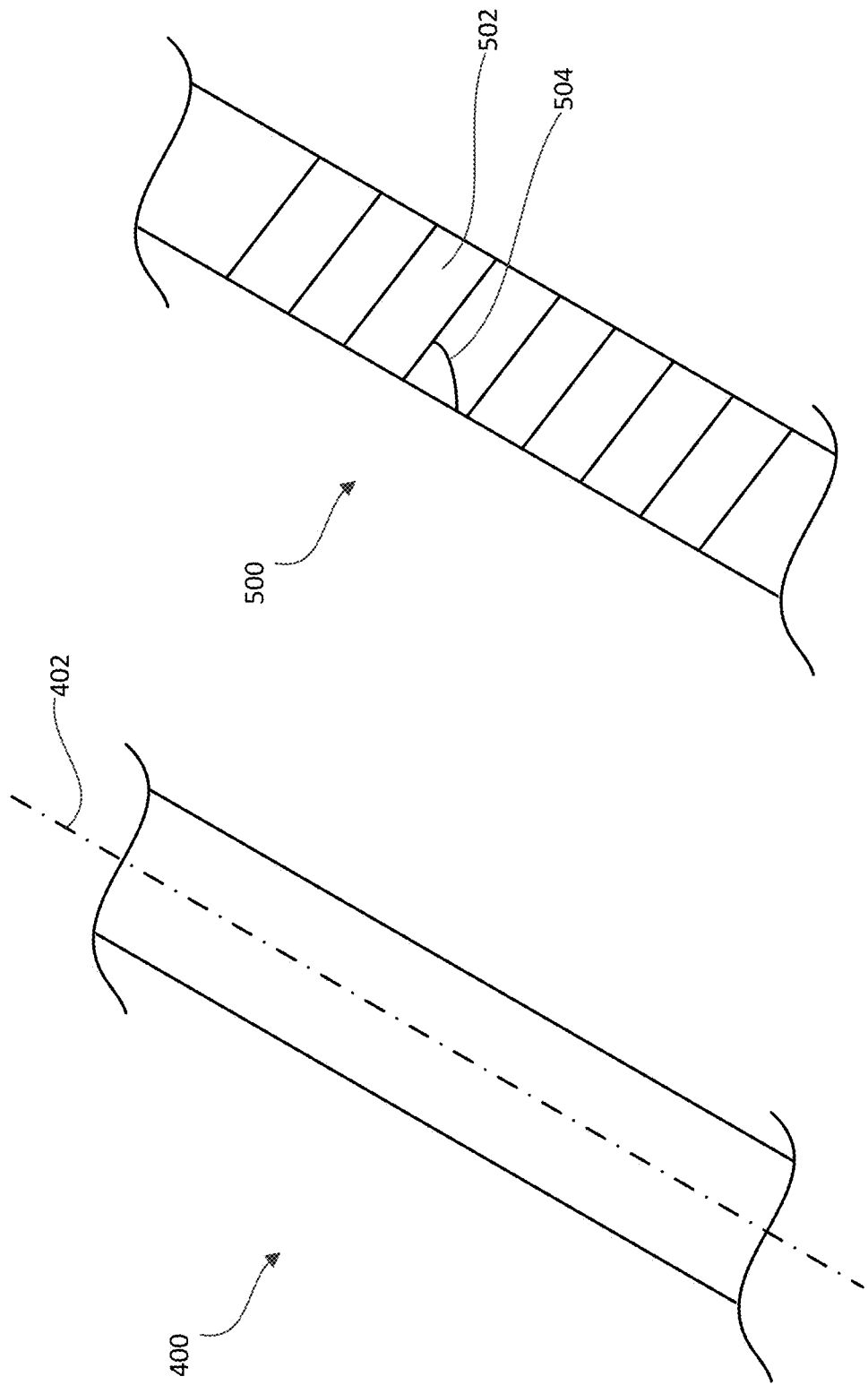

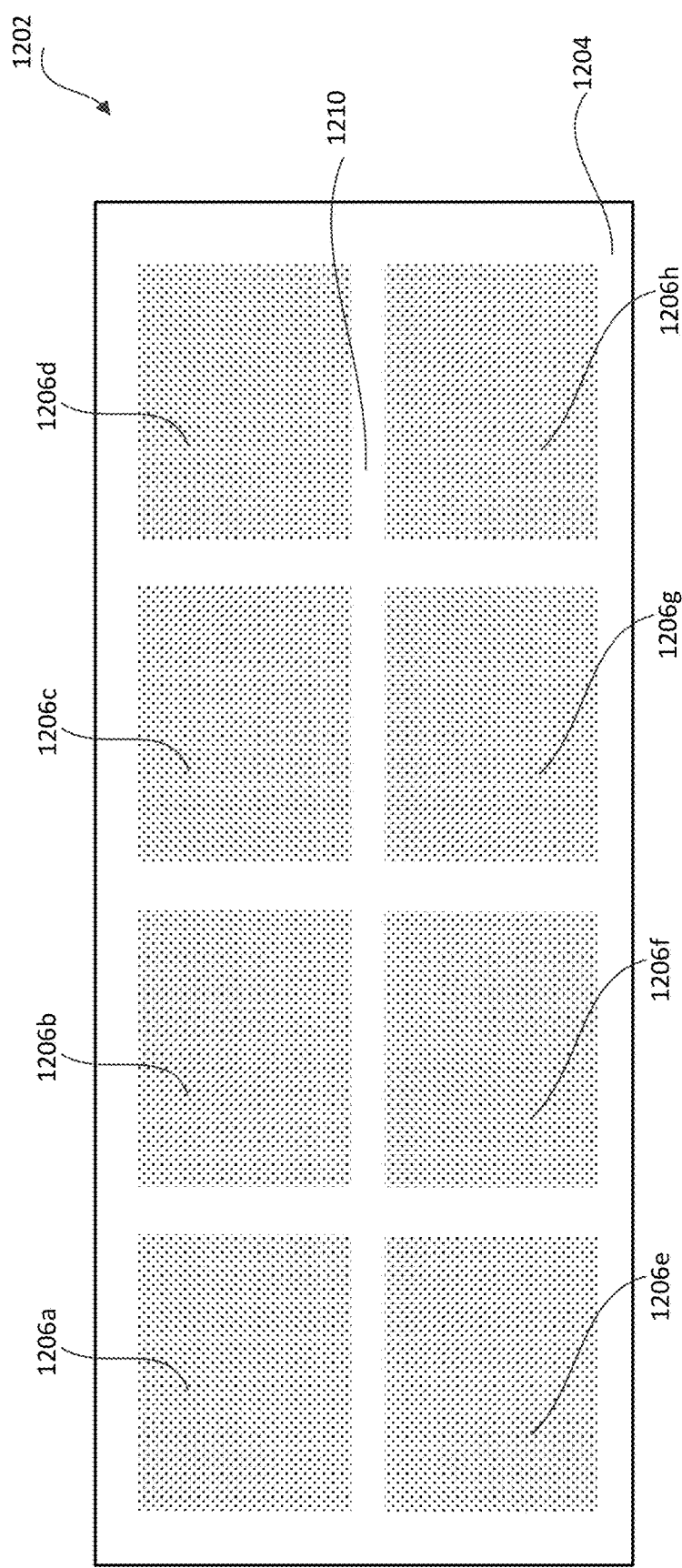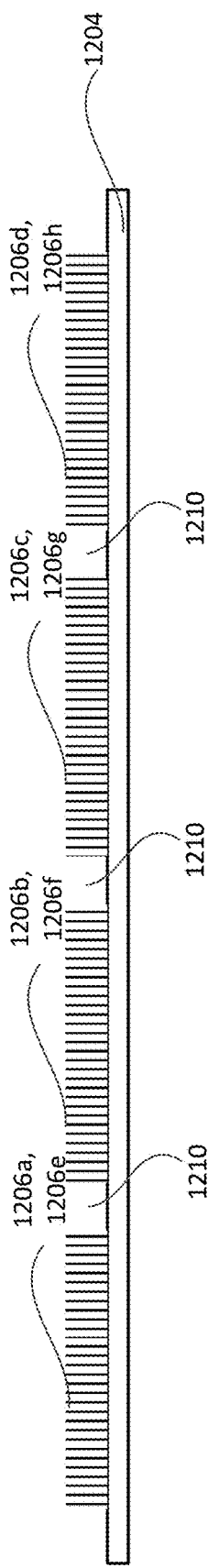
FIG. 12A
FIG. 12B

HOCKEY STICK WITH NANOFIBER REINFORCEMENT

CROSS-REFERENCE TO RELATED APPLICATION

This application claims priority to U.S. Provisional Patent Application No. 62/734,532, entitled "HOCKEY STICK WITH NANOFIBER REINFORCEMENT," filed on Sep. 21, 2018, which is expressly incorporated herein by reference in its entirety for any and all non-limiting purposes.

FIELD

This disclosure relates generally to fabrication of molded structures. More particularly, aspects of this disclosure relate to hockey stick shafts and blades molded using a nanofiber reinforcement material.

BACKGROUND

Hockey stick blades and shafts may be made from multiple layers of fiber-reinforced tape that are molded together using epoxy to form the hockey stick structure. This molding process involves use of the multiple layers of fiber-reinforced tape. Once molded, the formed parts may delaminate as a result of flexing and impact of the hockey stick during normal use. This inter-laminar weakness can, in certain instances, play a major role in the failure of the formed structures in select adaptations. Aspects of this disclosure relate to improved methods for production of a reinforced molded hockey stick, including molded shafts and blades.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

In one aspect of the disclosure, a hockey stick may have an increased resistance to delamination. The sporting implement can be formed by molding together layers of fiber tape, and increased mechanical strength and/or toughness may be achieved by including one or more layers of a bridge material. The bridge material may include nanofibers, such as carbon nanotubes.

Other objects and features of the disclosure will become apparent by reference to the following description and drawings.

BRIEF DESCRIPTION OF THE DRAWINGS

A more complete understanding of the present disclosure and certain advantages thereof may be acquired by referring to the following detailed description in consideration with the accompanying drawings, in which:

FIG. 2 depicts a side view of a hockey stick blade core wrapped with fiber tape, according to one or more aspects described herein.

FIG. 3 schematically depicts a cross-sectional view of a portion of the hockey stick blade structure of FIG. 2, according to one or more aspects described herein.

FIG. 4 schematically depicts a completed portion of a hockey stick shaft, according to one or more aspects described herein.

FIGS. 5-8 schematically depict multiple stages of a manufacturing process of the hockey stick shaft of FIG. 4, according to one or more aspects described herein.

FIG. 12A and FIG. 12B schematically depict another implementation of a bridge layer material, according to one or more aspects described herein.

The reader is advised that the attached drawings are not necessarily drawn to scale.

DETAILED DESCRIPTION

In the following description of various example structures in accordance with the disclosure, reference is made to the accompanying drawings, which form a part hereof, and in which are shown by way of illustration of various structures in accordance with the disclosure. Additionally, it is to be understood that other specific arrangements of parts and structures may be utilized, and structural and functional modifications may be made without departing from the scope of the present disclosure. Also, while the terms "top" and "bottom" and the like may be used in this specification to describe various example features and elements of the disclosure, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this disclosure.

Aspects of this disclosure relate to systems and methods for production of a hockey stick blade and/or the hockey stick shaft using a bridge layer reinforcement material. Aspects of this disclosure may also be applied to production of additional sporting implements using similar construction methods and materials, among others. These additional sporting implements may include, among others, tennis rackets (or other types of sports rackets), baseball bats, lacrosse sticks, golf clubs, or field hockey sticks, among others.

Figure 1:
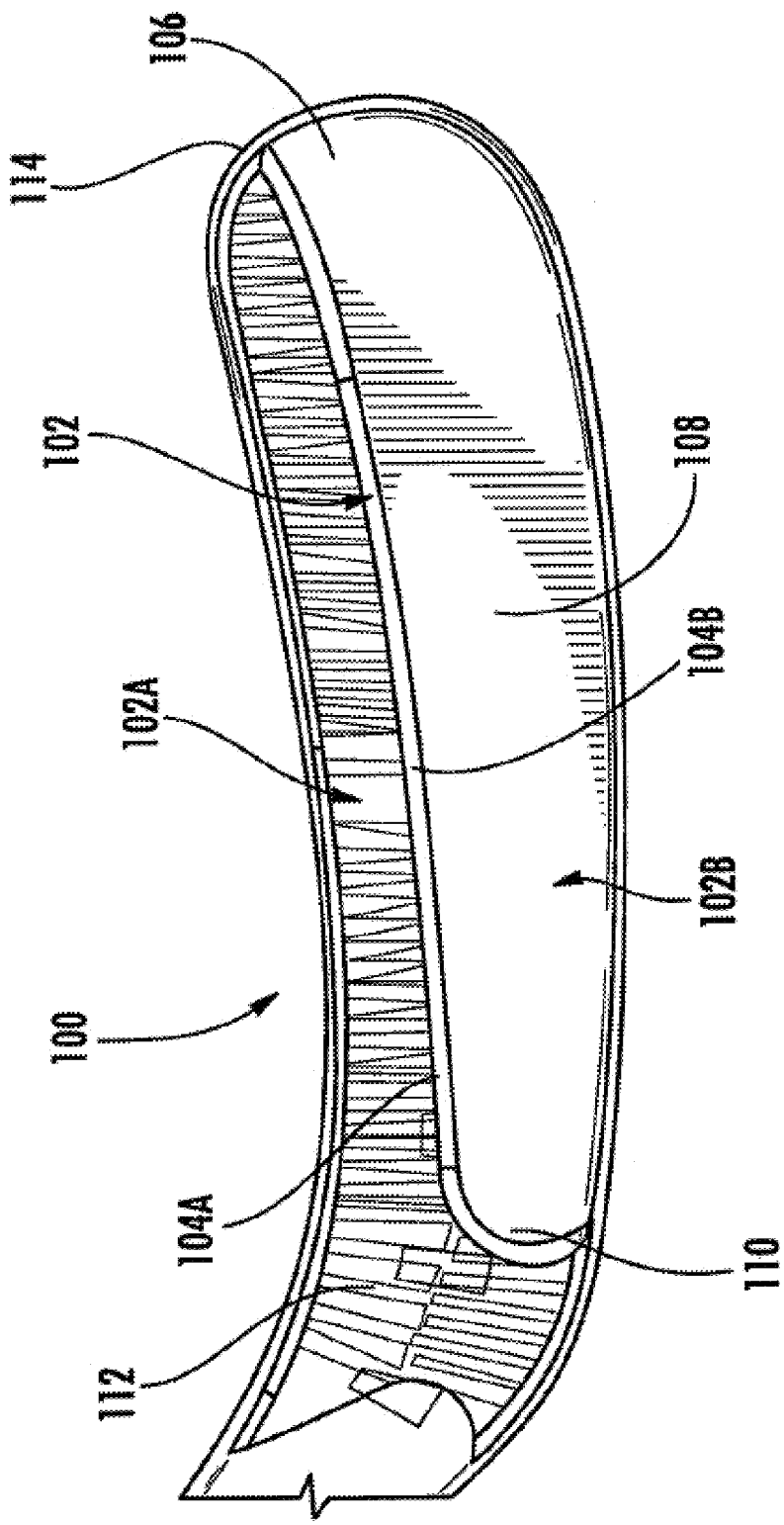
FIG. 1 depicts an implementation of a hockey stick blade structure within which reinforcing nanofiber elements may be used, according to one or more aspects described herein.

FIGS. 1-3 depict one implementation of a hockey stick blade structure 100 within which reinforcing or bridging nanofiber elements may be utilized. These natural fiber elements may include, in one example, carbon nanotubes. The reinforcing or bridging elements may otherwise be referred to as nanostitching. Accordingly, FIG. 1 schematically depicts a hockey blade 100 that has a toe region 106, a middle region 108 and a heel region 110. In one example, the core 102 of the hockey blade 100 can be formed from different foam types. For example, core 102 of the hockey blade 100 can be formed of a first lower density foam core portion 102A and a second higher density foam core portion 102B. Further, the first core portion 102A can be stitched using a thread 112 (shown in FIG. 2). In one specific example, the second core portion 102B may be formed of an epoxy having a plurality of polymeric shell microspheres. The first core portion 102A and the second core portion 102B may be bonded to form the continuous core 102. In particular, the first core portion 102A may have a bottom surface 104A that is bonded to a top surface 104B of the second core portion 102B during a molding and cross-linking process.

In the depicted example of FIG. 1, the first core portion 102A extends from the heel 110 of the blade to the toe region 106 of the blade. The first core portion 102A can be formed thickest at the heel region 110 of the blade and can taper from the heel region 110 of the blade to the toe region 106 of the blade. Forming the first core portion 102A thickest or widest in the heel region 110 may compensate for the loss of stiffness due to the lower density and lower modulus of the foam. The second core portion 102B may extend from the toe region 106 of the blade to the heel region 110 of the blade 100. The second core portion may be thickest at the toe region 106 of the blade 100 and can taper from the toe region 106 of the blade 100 to the heel region 110 of the blade 100. Both the first core portion 102A and the second core portion 102B can extend all the way to the toe edge 114 of the blade 100. It is understood, however, that other arrangements and ratios of the core portions 102A, 102B can be formed to accomplish different stick characteristics, weights, and strengths.

The hockey blade 100 may be wrapped with carbon fiber tape 22, as depicted in FIG. 2. The carbon fiber tape 22 is may be pre-impregnated with resin. As shown in FIGS. 2 and 3, the core 102 may include a first core face and a second core face and a layer of resin pre-impregnated tape 22 that is wrapped continuously around at least the first core face and the second core face. FIG. 2 illustrates a side view of the core 102 formed in the shape of a blade and wrapped with tape 22. FIG. 3 is a cross-sectional view taken along line 3-3 of FIG. 3, which shows the tape 22 wrapped continuously around the core 102. The tape 22 is wrapped continuously around the first face surface 30, the first edge 32, the second face surface 34 and the second edge 36. This continuous wrapping of the preform 20 with the tape 22 results in a first wrapped face 40, a second wrapped face 44, a top wrapped edge 42 and a bottom wrapped edge 46. The fiber tape 22 can be pre-impregnated with resin. The thickness of the tape 22 in FIG. 3 is exaggerated for purposes of more clearly illustrating the invention.

The first preform or core portion 102A and the second preform or core portion 102B can be wrapped with carbon fiber tape to create a wrapped preform. The preform may include a first face surface, a second face surface, a first edge surface and a second edge surface, and the fiber tape can be wrapped continuously around the first face surface, the first edge surface, the second face surface, and the second edge surface. As shown in FIG. 3, the preform has a first face surface 30, a first edge 32, a second face surface 34, and a second edge 36.

In certain examples, the fiber tape may be wrapped in various configurations around the core, such as at a 30° or 45° angle to the longitudinal axis of the blade. A second layer of pre-impregnated tape may be wrapped at a 90° angle to the tape.

The tape 22 may extend around the entire core to the end of the toe 106, but for purposes of more clearly illustrating aspects of the invention, the tape 22 is not shown extending to the end of the toe 106 of the core 102. In certain examples, the use of tape wrapped continuously around the entire core 102, including the edges, may be advantageous over a sandwich configuration in which the tape does not continuously extend of over the edges. A hockey blade must be very durable and capable of withstanding large forces from a variety of directions. For example, the hockey blade can encounter considerable forces, such as from striking a puck or the surface of the ice in multiple manners and angles. Thus, the core may benefit from reinforcement in all directions. The wrap configuration depicted in FIGS. 2 and 3 may result in a torsionally stiffer and stronger structure. The wrap configuration May also be better able to withstand shear forces.

It is to be understood that the tape need not consist of a single unitary piece or sheet of material. For example, the tape can consist of a combination of multiple pieces or sheets that overlap. After wrapping the core with a layer of fiber tape, a non-tacky veil can be placed on at least a portion of the first core portion 102A. The first core portion is then stitched with a polyester thread, and the thread extends between a first wrapped face and a second wrapped face.

A thread 112 in the pattern shown in FIG. 2 may be stitched along the layer of pre-impregnated tape on the first core portion. The thread can be formed of a high strength polyester, carbon fiber, or a carbon fiber pre-impregnated with resin, among others. A non-adhesive scrim can be applied to the portions of the resin pre-impregnated tape specifically along the first core portion 102A that extend along the first core face and the second core face to permit easier stitching of the blade. The non-adhesive scrim may be formed from woven fiberglass and/or polyester, among others.

The stitching is accomplished with an industrial sewing machine (not shown). Placement of the wrapped structure with tape pre-impregnated with resin in a sewing machine can cause the machine to stick or jam, and it can otherwise be difficult to operate the sewing machine with a sticky structure. The veil material described above is may not be sticky and thus may make it easier to stitch the wrapped core in the sewing machine.

The thread can extend from the first wrapped face 40 through the core 102 to the second wrapped face 44. The thread may also create the effect of an I-beam between the first wrapped face 40 and the second wrapped face 44 and adds structural and shear strength and rigidity between the faces. If the veil (not shown) were used, it may be positioned along the wrapped faces 40, 44 covering the first core portion and the thread 112 would be positioned along the veil.

The thread 112 may also pull the tape toward the first wrapped face 40 and the second wrapped face 44 at the point where the thread 112 enters the core 102. The wrapped, stitched core is not flat in that the result of the thread 112 pulling the tape 40 toward the core 102 and various locations creates a somewhat bumpy or pillow effect on the surface of the first wrapped face 40 and the second wrapped face 44. It is understood that other stitching patterns and types are also contemplated.

The wrapped preform may be placed in a mold, and the mold heated to an appropriate temperature. In one embodiment, the mold is heated to 140° C. However, any molding temperatures may be used, without departing from the scope of these disclosures. Upon heating, the epoxy softens, cross-links, and hardens, and the unexpanded or partially expanded microspheres expand in the epoxy mixture. A bond may be formed between the first core portion foam core and the layer of resin pre-impregnated tape. Also, the epoxy, microspheres, the other materials of the second core portion may bond to each other and also bond to the carbon fiber tape in the mold. Moreover, the first core portion and the second core portion materials may be bonded together by the cross-linking of the epoxy.

Figure 11:
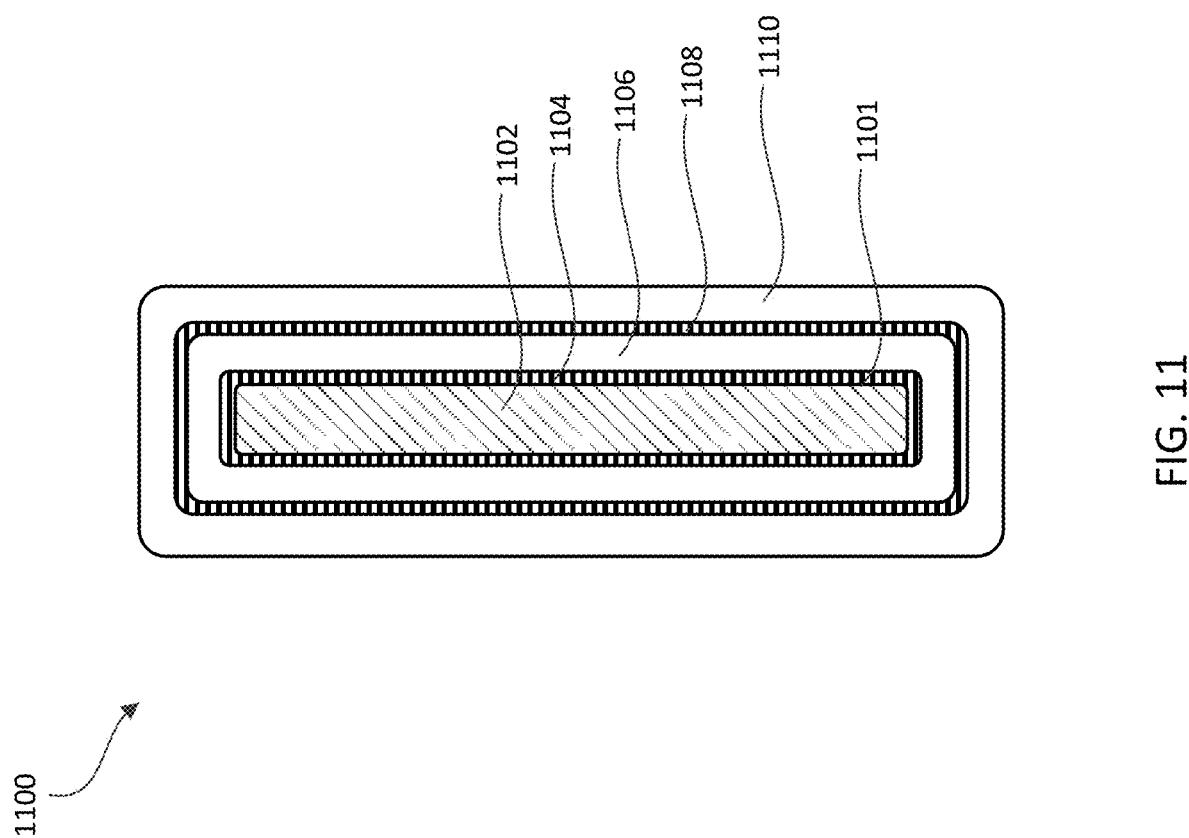
FIG. 11 schematically depicts a cross-sectional view of the hockey stick blade structure, according to one or more aspects described herein.

In addition to the implementations described in relation to FIGS. 1-3, the nanofiber reinforcement innovations described throughout this disclosure may be utilized with various additional or alternative implementations of a hockey stick blade structure. These additional or alternative implementations of a hockey stick blade may include core structures that include two or more core portions constructed from a single or multiple materials, such as multiple different foams. The nanofiber reinforcement material described herein may additionally be used with hockey stick structures, such as blade and shafts, which have hollow cores. Additionally, the nanofiber reinforcement, which may otherwise be referred to as nanostitching, may be used in combination with or as an alternative to stitching using comparatively larger fibers to reinforce layers of material used to construct a hockey stick blade. As such, nanostitching may be used to couple multiple foam layers of a core of a hockey stick blade structure, and/or to couple one or more layers of fiber tape to a hockey stick core. FIG. 11 schematically depicts one implementation of the use of nanostitching an interface of a hockey stick blade core and an innermost fiber layer, as described in further detail in the proceeding sections. Additional examples of the hockey stick blade construction with which the nanofiber reinforcement innovations may be utilized are described in U.S. Pat. Nos. 7,824,591, 8,677,599, and 9,802,369 the entire contents of which are incorporated fully herein by reference.

FIGS. 4-8 schematically depict different stages of a manufacturing process of a portion of a hockey stick shaft 400, according to one or more aspects described herein. In particular, FIG. 4 schematically depicts a completed portion of a stick shaft 400, which may be coupled to the blade 100. The stick shaft 400 has a longitudinal axis, schematically depicted as axis 402, which extends along the length of the shaft 400. In in one implementation, the stick shaft 400 may be constructed from multiple layers of fiber tape. The fiber tape may be pre-impregnated with resin, and/or may have resin applied between layers during one or more manufacturing processes. It is contemplated that fiber tape, as described herein, may include carbon fibers and/or glass fibers, among others. It is further contemplated that fiber tape may have any thickness, length, and/or width values, without departing from the scope of these disclosures. The fiber tape may additionally include any polymer material as a matrix through which the fibers are woven and held.

Figure 6:
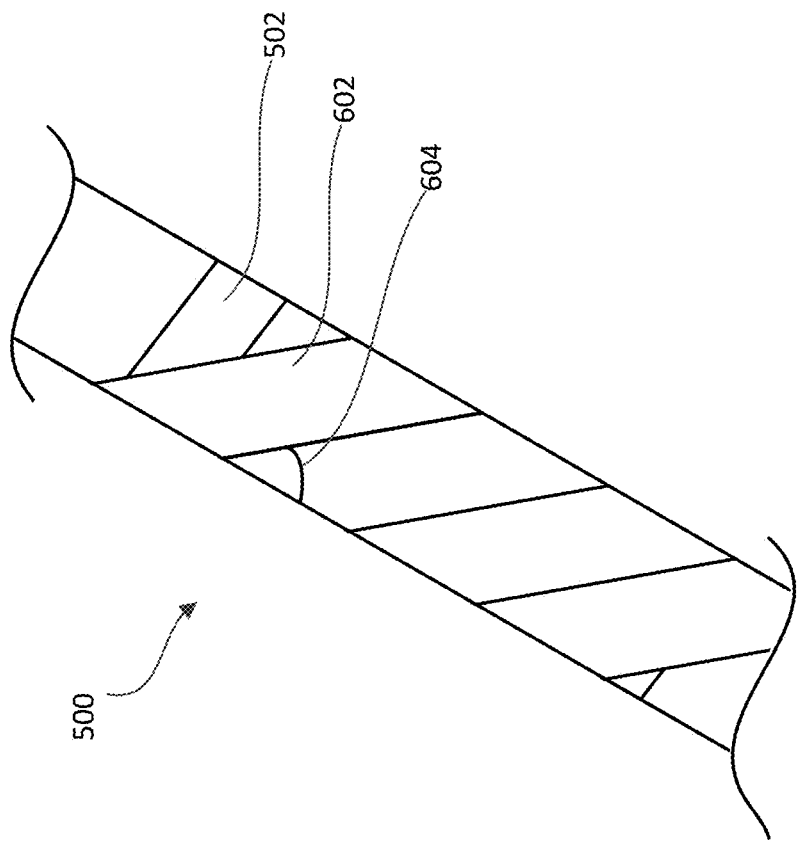

FIG. 5 schematically depicts a first stage of a manufacturing process of the stick shaft 400. Accordingly, FIG. 5 schematically depicts a stick shaft preform 500 that includes first layer of fiber tape 502 that is used to construct a shaft preform structure. In one example, the first layer of fiber tape 502 may be wrapped around a mandrel structure (not depicted). This mandrel structure may be removed prior to or following a molding process of the stick shaft preform 500 to form the completed stick shaft 400. As depicted, the wrappings of the first layer of fiber tape 502 are oriented at a relatively large angle 504 relative to the longitudinal axis 402. FIG. 6 schematically depicts a second stage of a manufacturing process of the stick shaft 400. Accordingly, FIG. 6 schematically depicts the stick shaft preform 500 that includes a second layer of fiber tape 602 that is used to construct a shaft preform structure. In one example, the second layer of fiber tape 602 may be wrapped around the first layer 502. As depicted, the wrappings of the second layer of fiber tape 602 are orientated at an angle 604 relative to the longitudinal axis 402. Further, angle 604 may be less than angle 504.

In one implementation, the closer angle 504 is to 0 degrees, the higher the mechanical stiffness of the second layer of fiber tape 602, once molded. However, in order to achieve a described stiffness profile, a combination of different orientations of layers of fiber tape (e.g., layers 502 and 602) may be used within stick shaft 400. In one example, the shaft 400 may be manufactured from layers of fiber tape that are positioned with a higher angle 504 at an inner layer 502, and a lower angle 604 at an outer layer 602. Further, the lower the angle 604, the greater the interlaminar shear force experienced between the layers of fiber tape upon mechanical loading (flexing) of the shaft 400. This interlaminar shear results in mechanical weakening and failure of the stick shaft 400 following repeated and/or high levels of mechanical loading. It is therefore desirable to increase the strength of the stick shaft without adversely increasing the mass or flexing characteristics of the shaft 400. In one example, a bridge layer 702 of reinforcing material may be positioned between two of more layers of fiber tape (e.g. between layers 602 and 802).

Figure 7:
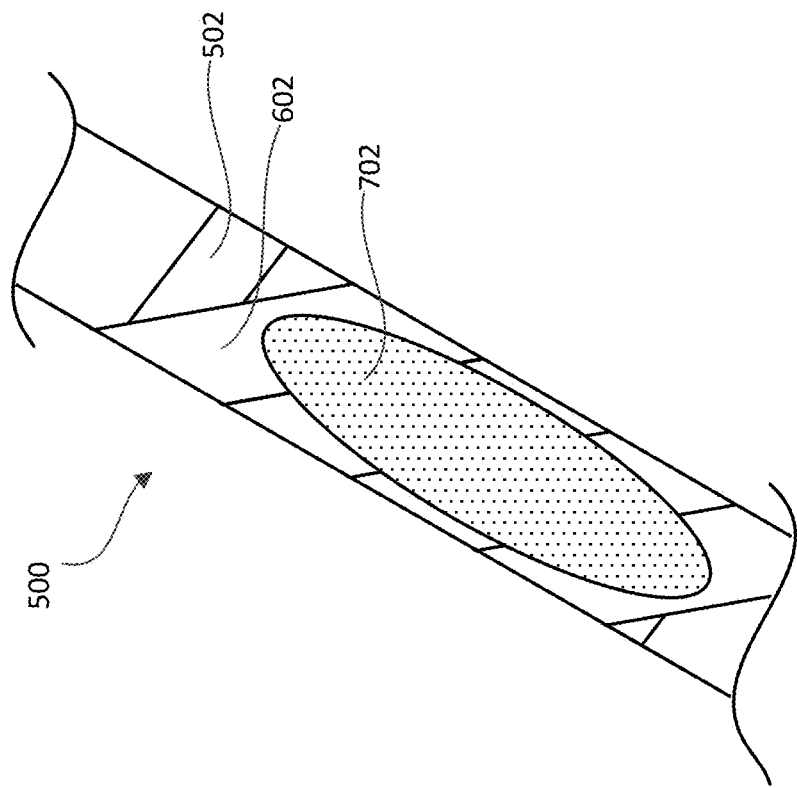

The bridge layer 702 of reinforcing material is schematically depicted in FIG. 7, and may be implemented with any geometry and at any location within the stick shaft preform 500, without departing from the scope of these disclosures. In one example, the bridge layer 702 includes fibers that have longitudinal lengths that are oriented approximately perpendicular to the longitudinal lengths of the fibers of fiber tape layers 602 and 802. As such, the fibers of bridge layer 702 may extend into the resin molded around the fibers of tape layers 602 and 802 and form a structural bridge that increases the mechanical toughness of the bond between layers 602 and 802. In one implementation, the fibers of the bridge layer 702 may include carbon nanotubes. Further, in one example, the carbon nanotubes of the bridge layer 702 may measure between 2 and 25 µm in length. However, carbon nanotubes of any length may be used, without departing from the scope of these disclosures.

Figure 8:
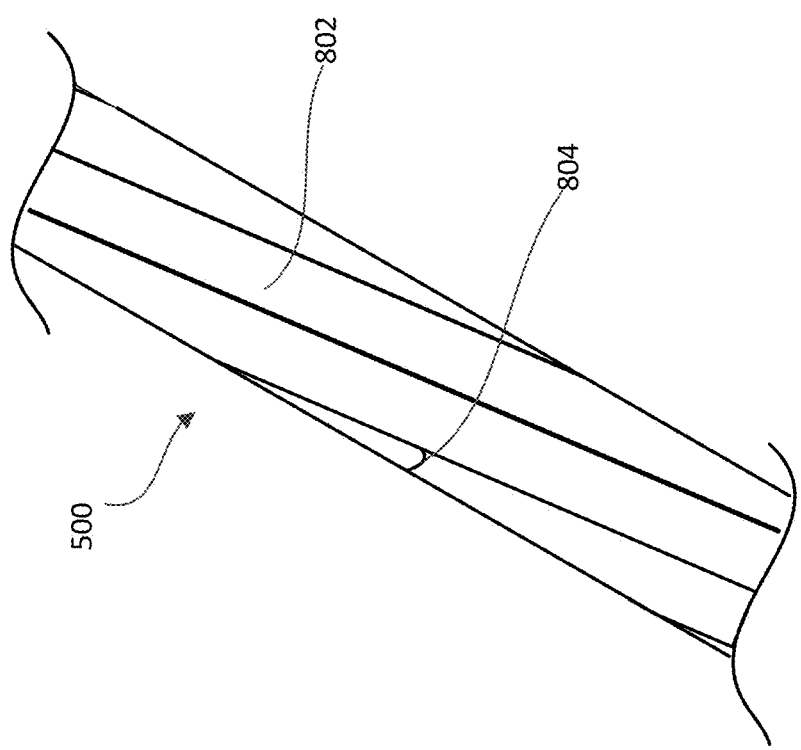

FIG. 8 schematically depicts a third layer of fiber tape 802 that is used to construct the stick shaft preform 500 that is molded to form the shaft structure 400. As depicted, the fiber tape 802 is oriented at an angle 804 relative to the longitudinal axis 402. In one example, the third layer of fiber tape 802 is wrapped on top of the second layer of fiber tape 602, such that the bridge layer 702 is positioned between the layers 602 and 802, or a portion thereof. It is contemplated that angles 504, 604, and 804 may have any values. In certain examples, angles 504, 604, and 804 may measure approximately 45°, 30°, 25°, 19°, 0°. In another example, any of angles 504, 604, and 804 may measure between 0° and 90°. It is further contemplated that angles 504, 604, and 804 represent angles between the longitudinal axes of the fiber tapes and the longitudinal axis 402 of the shaft 400. Further, it is contemplated that the longitudinal axes of the fiber tapes correspond to the directional along which the fibers of the fiber tapes are primarily aligned.

It is contemplated that the construction methodology described in relation to FIGS. 4-8 for a hockey stick shaft 400 may be utilized to construct a hockey stick blade, such as blade 100 or any other portion of a hockey stick.

Figure 9:
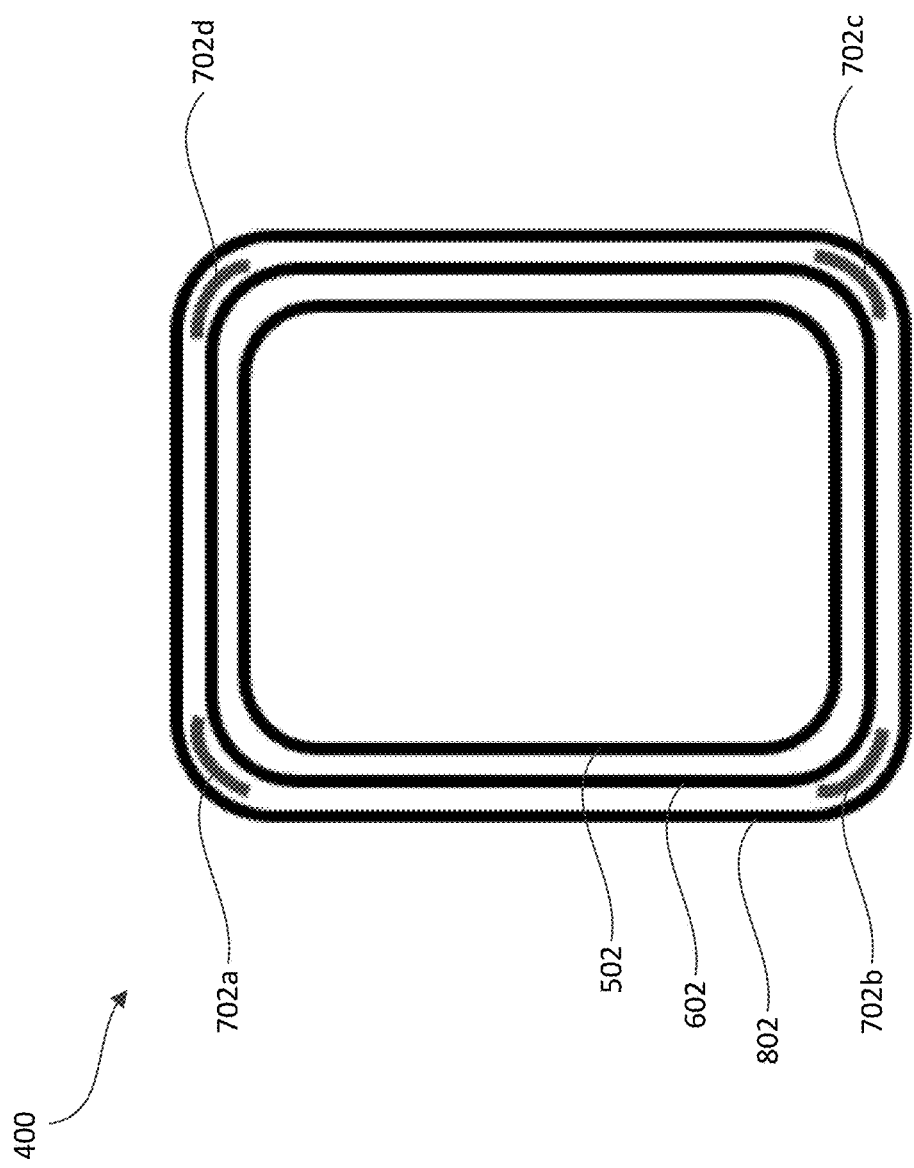
FIG. 9 schematically depicts a cross-sectional view of the hockey stick shaft of FIG. 4, according to one or more aspects described herein.

FIG. 9 schematically depicts a cross-sectional view of the hockey stick shaft 400. As depicted, the shaft 400 is constructed from fiber tape layers 502, 602, and 802. In the depicted implementation, the bridge layer 702 is implemented as bridge layer portions 702a-702d at the corners of the shaft 400. In the depicted implementation, the bridge layer portions 702a-702d serve to reinforce the corners of the shaft 400, which experience the highest impact forces during use of the shaft 400 during gameplay. It is contemplated that the bridge layer 702 may be implemented as additional or alternative portions within the shaft 400, without departing from the scope of these disclosures. Further, it is contemplated that the three fiber tape layers 502, 602, and 802 represent a schematic implementation of the shaft 400, and as such, additional layers of fiber tape and/or bridge layers of reinforcing material similar to material 702 may be used, without departing from the scope of these disclosures.

Figure 10:
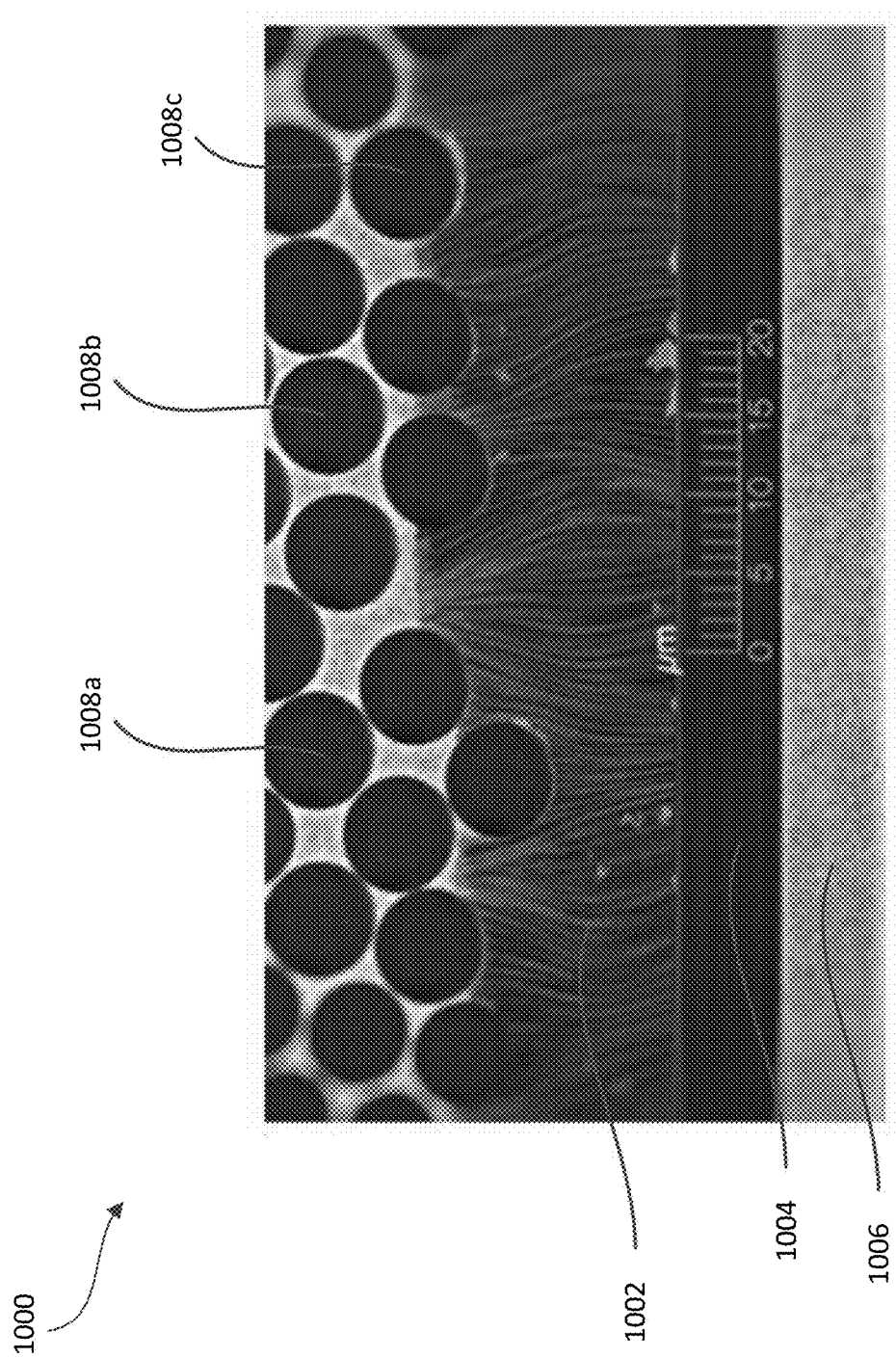
FIG. 10 depicts a cross-sectional view of a molded structure that utilizes a bridge layer of reinforcing material, according to one or more aspects described herein.

FIG. 10 depicts a cross-sectional view of a molded structure 1000 that utilizes a bridge layer 1002 of reinforcing material, similar to bridge layer 702. As depicted, the structure 1000 includes a first fiber layer that is made up of fibers extending in a first direction. Fiber 1004 is one fiber of the first fiber layer and is encapsulated within resin 1006. The structure 1000 includes a second fiber layer that is made up of fibers extending in a second direction, perpendicular to the first direction. Fibers 1008a-1008c are exemplary fibers of this second fiber layer. The fibers of bridge layer 1002 extend approximately perpendicular to the first direction and the second direction, and extend between the fibers of the first layer 1004 and the fibers of the second layer 1008a-1008c. As such, the fibers of the bridge layer 1002 extend through and reinforce the resin that binds the first and second fiber layers.

FIG. 11 schematically depicts a cross-sectional view of a hockey stick blade structure 1100, according to one or more aspects described herein. In particular, FIG. 11 schematically depicts the use of nanostitching 1104, or nanofiber reinforcement, at an interface 1101 between a core 1102 and an innermost layer of fiber material 1106 (e.g. fiber tape). Additionally, FIG. 11 depicts a second nanostitching bridge layer 1108 that strengthens the interface between the innermost layer of fiber material 1106, and an outer layer of fiber material 1110. Accordingly, as depicted, FIG. 11 schematically depicts two layers of fiber material 1106 and 1110 of a hockey stick blade structure 1100. However, it is contemplated that fewer than or more than the two depicted layers of fiber material 1106 and 1110 may be used to construct a hockey stick blade structure 1100, without departing from the scope of these disclosures. It is further contemplated that a nanostitching bridge layer may be utilized at each interface between any additional fiber layers similar to layers 1106 and 1110. In another example, nanostitching may be used at the interface 1101, and may not be used between any of the fiber material layered on top of the core 1102, or between a subset of all of the layers of fiber material layered on top of the core 1102. It is further contemplated that the core 1102 may include any foam material, among others.

FIG. 12A and FIG. 12B schematically depict another implementation of a bridge layer material 1202, according to one or more aspects described herein. In particular, FIG. 12A schematically depicts a plan view of the bridge layer material 1202, and FIG. 12B schematically depicts an elevation view of the same bridge layer material 1202. Accordingly, the bridge layer 1202 may be similar to bridge layer 702, and may be incorporated into a hockey stick structure to provide enhanced structural properties and/or reduce a mass of the hockey stick structure. The bridge layer 1202 includes a substrate 1204. Carbon nanotubes 1206 extend approximately perpendicular to the plane of the substrate 1204. In one example, the substrate 1204 may comprise one or more layers of fiber material that is made of fibers that have larger cross-sectional areas than the carbon nanotubes 1206. As such, the substrate 1204 may include a fiber tape that includes a resin. In another example, the substrate 1204 may be constructed from one or more polymers, and may not include fiber reinforcement. In one example, the bridge layer 1202 may be similar to the bridge layer 1002.

As depicted in FIG. 12A, the bridge layer 1202 may include several clusters of carbon nanotubes, which are schematically depicted as clusters 1206a-1206h in FIGS. 12A and 12B. It is noted that the bridge layer 1202 depicted in FIG. 12A is merely one example of a bridge layer 1202, and the size of the bridge layer 1202, the number of clusters 1206, and the relative size of any of the elements of the bridge layer 1202 may be varied, among others, without departing from the scope of these disclosures. For example, while the clusters 1206a-1206h are schematically depicted in FIG. 12A as being rectangular in shape, alternative geometries may be utilized, or combinations of different geometries. Further, clusters may be regularly or irregularly shaped, and may be regularly or irregularly spaced apart from one another. In the schematic depiction of FIG. 12A, the clusters 1206a-1206h are spaced apart from one another, forming channels 1210 therebetween. These channels 1210 may allow resin to flow out of a structure that is being molded using the bridge layer 1202, which may reduce a mass of the formed structure, once fully molded. In one specific example, at least 5%, 10%, 15%, 25%, 30%, 40%, 50%, or 60% of a surface area of the substrate 1204 may be made up of the channels 1210. Further, the channels 1210 may allow a structure constructed using the bridge layer 1202 to have a mass that is at least 1%, 2%, 5%, 10%, 15%, 20%, or 25% lower than an equivalent structure constructed using a bridge layer with carbon nanotubes similar to those carbon nanotubes 1206, but without the channels 1210.

Figure 13:
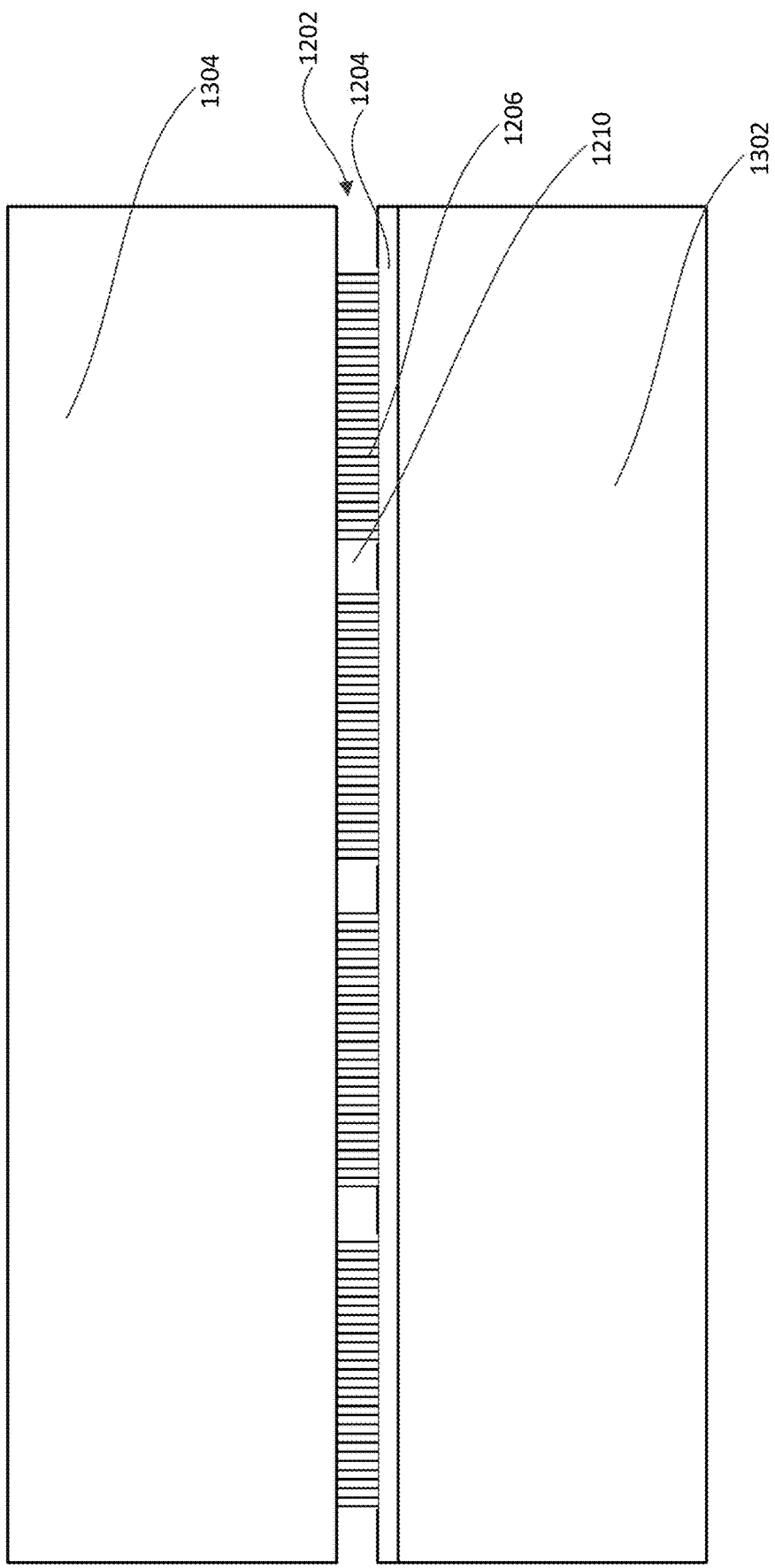
FIG. 13 schematically depicts a cross-sectional view of a bridge layer molded between two layers of a hockey stick structure, accordingly to one or more aspects described herein.

FIG. 13 schematically depicts a cross-sectional view of a bridge layer 1202 molded between two layers 1302 and 1304 of a hockey stick structure, accordingly to one or more aspects described herein. It is contemplated that any methodology for molding a structure using fiber-reinforced layers 1302 and 1304 may also be utilized with the bridge layer 1202, without departing from the scope of these disclosures. Accordingly, the layers 1302 and 1304 may include one or more layers of fiber-reinforced material that may be pre-impregnated with resin prior to molding.

The nanofiber reinforcement layers described throughout this disclosure may be utilized in various embodiments. In one example, a fiber material from which a hockey stick is constructed may be prepared as a fiber tape that is pre-impregnated with resin and coated with nanofibers. This nanofiber coating may cover a portion of the fiber tape, or may cover all of the fiber tape (e.g., all of both outer surfaces of a fiber tape). In one specific example, the fiber tape may include carbon fiber strands, and the nanofibers may include carbon nanotubes. Further, the pre-impregnated resin within the fiber tape may be implemented with various different resin types. Accordingly, this fiber tape that is pre-impregnated with resin may be implemented as a thermoset material. In another example, the nanofiber reinforcement described throughout this disclosure may be used in combination with a dry fiber material to which a resin is applied separately in order to construct a hockey stick structure. As such, this dry fiber may be implemented as a thermoplastic material. In another example, the nanofiber reinforcement may be implemented as a resin that is enriched with nanofibers (rather than a nanofiber coating that is applied to the resin). This enriched nanofiber material may be combined with a fiber tape to form a pre-preg (pre-impregnated) material, or may be applied to dry fiber tape or other fiber material as a separate resin.

In certain examples an amount of nanofiber reinforcement that is to be included within a hockey stick structure may be based upon a number of layers of fiber-reinforced material that are used in the construction of the hockey stick structure. For example, nanofibers or bridge layers may be used with a frequency or loading of approximately 50%. In other words, nanofiber reinforcement may be used between approximately 50% of the layers of fiber tape used to construct a hockey stick structure. This loading percentage may have other values, without departing from the scope of this disclosure. For example, nanofibers may be used with a loading of approximately 5%, 10%, 20%, 25%, 30%, 40%, or 60%, among others.

Additionally or alternatively, an amount of nanofiber reinforcement used to construct a hockey stick structure may be based upon the orientation of the fiber tape layers. For example, nanofiber reinforcement or bridge layers may be used between fiber tape layers that are angled at 30° or less relative to a longitudinal axis 402 of the stick shaft (similar methodology may be used relative to a central axis of a hockey stick blade, among other axes of a structure). For example, the bridge layer 702 is used between layers 602 and 802 when angle 604 is, for example, less than 30°. However, it is contemplated that this 30° threshold may have other angle values, without departing from the scope of these disclosures.

Advantageously, the use of nanofibers may increase the strength of a hockey stick structure. Correspondingly, a mass of the hockey stick structure may be reduced while maintaining a structural integrity (strength, toughness etc.) at a same level as an equivalent hockey stick structure that does not utilize nanofibers. In one example, the nanofibers, due to their vertical/perpendicular alignment relative to the proximate fiber tape layers, will achieve a consistent gap between plies of the fiber tape. As a consequence, a resin content of a hockey stick structure prior to molding may be reduced. Further, because of the enhanced mechanical properties of a stick structure constructed using the nanofibers, one or more plies/layers of fiber taper material may be removed/omitted from the hockey stick structure. In this way, a mass of a hockey stick structure constructed using nanofibers may be reduced. In certain examples, the resin content of a pre-impregnated fiber tape may be reduced in order to accommodate nanofibers entrained within the resin. Further, an overall mass of the fiber tape, and hence, the hockey stick structure constructed using the fiber tape, may be reduced by the introduction of nanofibers and corresponding reduction of the amount of resin. In other examples, nanofibers may be added to fiber tape that is pre-impregnated with fiber tape without reducing the resin content of the tape.

In certain examples the use of nanofibers to construct the hockey stick shaft 400 and/or stick blade 100 increase one or more of impact strength, ultimate strength, and fatigue strength. In certain examples, use of nanofibers may increase impact strength and/or ultimate tensile strength of a given structure of a hockey stick by 15% or more.

In one implementation, a hockey stick structure may include a stick blade similar to stick blade 100 and a stick shaft similar to stick shaft 400. The blade of this hockey stick structure may be molded from a first composite material, with the first composite material further including a first fiber layer having first fibers extending in a first direction, and a second fiber layer having second fibers extending in a second direction, non-parallel to the first direction. The hockey stick structure may further include a shaft, integrally formed with the blade, with the shaft molded from a second competent material. The second competent material may further include a third fiber layer having third fibers extending in a third direction, and a fourth fiber layer having fourth fibers extending in a fourth direction, non-parallel to the third direction. The hockey stick shaft may further include a bridge layer, similar to bridge layer 702, extending around a corner of the shaft and positioned between a portion of the third fiber layer and the fourth fiber layer. The corner of the shaft may have an external angle measuring 210 degrees or more and the bridge layer may have fifth fibers that extend in a direction approximately normal to the third and fourth fibers. The bridge layer may have channels that extend between at least two clusters of the fifth fibers. Additionally, the first fiber layer, the second fiber layer, and the bridge layer may be molded to one another by an epoxy resin.

In one example, the shaft of the hockey stick structure may include a plurality of additional fiber layers and a plurality of additional bridge layers. The plurality of additional fiber layers may be in addition to the third fiber layer of the fourth fiber layer. The plurality of additional bridge layers may be in addition to the bridge layer of the shaft. Accordingly, a bridge layer, of the plurality of additional bridge layers, may be positioned between at least 25% of each pair of adjacent layers of the additional fiber layers.

In another example, a hockey stick structure may include a plurality of additional fiber layers and a plurality of additional bridge layers, such that the plurality of additional bridge layers are positioned between at least 5% of the additional fiber layers.

In another example, the fifth fibers of the bridge layer may be coated onto the portion of the third fiber layer and the fourth fiber layer.

In one example, the fifth fibers of the bridge layer may be entrained within resin of the third fiber layer and the fourth fiber layer.

Further, a resin content and a mass of the third fiber layer and the fourth fiber layer may be comparatively lower than a fiber layer that does not include the fifth fibers.

In another example, a resin content and a mass of the third fiber layer and the fourth fiber layer may be comparatively lower than a fiber layer that is not adjacent to the fifth fibers.

The fifth fibers of the bridge layer may include carbon nanotubes, and the carbon nanotubes may measure between 2 and 25 μm in length. Further, the first, second, third, and fourth fibers may include carbon fibers, glass fibers, or a combination thereof.

In one example, the third direction associated with the third fibers may be approximately perpendicular to the fourth direction associated with the fourth fibers. In another example, an angle between the third direction and the fourth direction may measure between 0 and 90 degrees.

In another aspect, hockey stick blade structure, similar to blade 100, may be molded from a composite material that includes a first fiber layer having fibers extending in a first direction, and a second fiber layer having fibers extending in a second direction. The first composite material may further include a bridge layer that extends between a portion of the first fiber layer the second fiber layer. The bridge layer may have fibers that extend approximately perpendicular to the first and second fibers, such that the portion of the first layer and the second layer has an angle between the first direction and the second direction measuring less than 45°.

In another aspect, a hockey stick shaft structure may be molded from a composite material, and include a first fiber layer that has fibers extending in a first direction, a second fiber layer, layered on top of the first fiber layer, having fibers extending in a second direction, and a third fiber layer, layered on top of the second fiber layer, having fibers extending in a third direction. The hockey stick shaft structure may additionally include a bridge layer extending between a portion of the second fiber layer and the third fiber layer, with the bridge layer having fibers extending approximately perpendicular to the second and third fibers. Further, the portion of the second layer on the third layer may have an angle between the second direction and the third direction measuring less than 45°.

In another aspect, a hockey stick shaft structure may be molded from a composite material, and include a first fiber layer that has fibers extending in a first direction, a second fiber layer, layered on top of the first fiber layer, having fibers extending in a second direction, and a third fiber layer, layered on top of the second fiber layer, having fibers extending in a third direction. The hockey stick shaft structure may additionally include a bridge layer extending between a portion of the second fiber layer and the third fiber layer, with the bridge layer having fibers extending approximately perpendicular to the second and third fibers. The bridge layer may include channels that extend between at least two clusters of fibers. Further, the portion of the second layer on the third layer may have an angle between the second direction and the third direction measuring less than 90°, or less than 45°, among others.

The hockey stick shaft structure may additionally include a plurality of additional fiber layers and the plurality of additional bridge layers, with the plurality of additional bridge layers positioned between at least 5% of the additional fiber layers.

In one example, the fibers of the bridge layer may be coated onto the portion of the second fiber layer and the third fiber layer.

In one example, the fibers of the bridge layer may be entrained within resin of the second fiber layer and the third fiber layer.

In one example, the fibers of the bridge layer may include carbon nanotubes, and the carbon nanotubes may measure between 2 and 25 µm in length.

The fibers of the first, second, and third, fiber layers may include carbon fibers and/or glass fibers.

In another example, the third direction of the third fiber layer may be approximately perpendicular to the fourth direction of the fourth fiber tape layer.

A portion of the fibers of the bridge layer may extend between and abut a portion of the fibers of the second fiber layer and a portion of the fibers of the third fiber layer.

A method of forming a hockey stick shaft may include forming a shaft preform from a composite material, with the composite material formed by layering a first fiber tape and a second fiber tape on a mandrel, and positioning a bridge layer between a portion of the first and second fiber tape layers. The bridge layer may extend around a corner of the shaft preform, such that the bridge layer may have fibers that extend in a direction approximately normal to the fibers of the first and second fiber tapes. The method may additionally include positioning the shaft preform in a mold, and heating and cooling the mold before removing the mandrel from the molded shaft.

The bridge layer may include carbon nanotubes, which may measure between 2 and 25 µm in length.

In another example, the first and second fiber tapes may include carbon fibers and/or glass fibers.

In yet another example, the corner of the shaft preform may have an external angle measuring at least 210°.

Additionally, the first and second fiber tapes may be pre-impregnated with resin.

The reader should understand that these specific examples are set forth merely to illustrate examples of the invention, and they should not be construed as limiting the invention. Many variations in the connection system may be made from the specific structures described above without departing from this invention.

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

We claim:

1. A hockey stick structure, comprising:
    a blade, molded from a first composite material, the first composite material further comprising:
        a first fiber layer having first fibers extending in a first direction;
        a second fiber layer having second fibers extending in a second direction, non-parallel to the first direction;
    a shaft coupled to the blade, the shaft molded from a second composite material, the second composite material further comprising:
        a third fiber layer having third fibers extending in a third direction;
        a fourth fiber layer having fourth fibers extending in a fourth direction, non-parallel to the third direction; and
        a bridge layer extending around a corner of the shaft and positioned between a portion of the third fiber layer and the fourth fiber layer, wherein the bridge layer has fifth fibers extending in a normal direction to the third and fourth fibers, wherein the bridge layer has channels extending between at least two clusters of the fifth fibers,
    wherein the third fiber layer, and fourth fiber layer, and the bridge layer are molded to one another by an epoxy resin.

2. The hockey stick structure of claim 1, the shaft further comprising:
    a plurality of additional fiber layers and a plurality of additional bridge layers, wherein the plurality of additional bridge layers are positioned between at least 5% of the additional fiber layers.

3. The hockey stick structure of claim 1, wherein the fifth fibers of the bridge layer are coated onto the portion of the third fiber layer and the fourth fiber layer.

4. The hockey stick structure of claim 1, wherein the fifth fibers of the bridge layer are entrained within resin of the third fiber layer and the fourth fiber layer.

5. The hockey stick structure of claim 4, wherein a resin content of the third fiber layer and the fourth fiber layer are comparatively lower than a fiber layer that is not adjacent to the fifth fibers.

6. The hockey stick structure of claim 1, wherein the fifth fibers comprise carbon nanotubes.

7. The hockey stick structure of claim 6, wherein the carbon nanotubes measure between 2 and 25 microns in length.

8. The hockey stick structure of claim 1, wherein the first, second, third and fourth fibers are carbon fibers.

9. The hockey stick structure of claim 1, wherein the first, second, third and fourth fibers are glass fibers.

10. The hockey stick structure of claim 1, wherein the third direction is approximately perpendicular to the fourth direction.

\* \* \* \* \*